(12) United States Patent
Armstrong et al.

(10) Patent No.: US 9,077,659 B2
(45) Date of Patent: *Jul. 7, 2015

(54) PACKET ROUTING FOR EMBEDDED APPLICATIONS SHARING A SINGLE NETWORK INTERFACE OVER MULTIPLE VIRTUAL NETWORKS

(71) Applicant: International Business Machines Corporation, Armonk, NY (US)

(72) Inventors: William J. Armstrong, Rochester, MN (US); Josep Cors, Rochester, MN (US); David R. Engebretsen, Cannon Falls, MN (US); Paul E. Movall, Rochester, MN (US); Eric G. Thiemann, Owatonna, MN (US)

(73) Assignee: International Business Machines Corporation, Armonk, NY (US)

( * ) Notice: Subject to any disclaimer, the term of this patent is extended or adjusted under 35 U.S.C. 154(b) by 188 days.

This patent is subject to a terminal disclaimer.

(21) Appl. No.: 13/710,530

(22) Filed: Dec. 11, 2012

(65) Prior Publication Data

US 2013/0208728 A1 Aug. 15, 2013

Related U.S. Application Data

(63) Continuation of application No. 13/396,090, filed on Feb. 14, 2012.

(51) Int. Cl.
*H04L 12/28* (2006.01)
*H04L 12/721* (2013.01)
*H04L 12/931* (2013.01)

(52) U.S. Cl.
CPC .............. *H04L 45/44* (2013.01); *H04L 49/355* (2013.01)

(58) Field of Classification Search
CPC ....................................................... H04L 45/44
USPC .............................................................. 370/401
See application file for complete search history.

(56) References Cited

U.S. PATENT DOCUMENTS

| 7,743,166 | B2* | 6/2010 | Dobbins et al. | 709/238 |
| 7,869,366 | B1* | 1/2011 | Muppala et al. | 370/238 |
| 8,498,300 | B2* | 7/2013 | Kwon et al. | 370/400 |
| 2006/0221832 | A1 | 10/2006 | Muller et al. | |
| 2007/0233825 | A1* | 10/2007 | Brownell et al. | 709/220 |

(Continued)

OTHER PUBLICATIONS

U.S. Appl. No. 13/396,090, entitled "Packet Routing for Embedded Applications Sharing a Single Network Interface Over Multiple Virtual Networks", filed Feb. 14, 2012.

(Continued)

*Primary Examiner* — Christopher R Crompton
(74) *Attorney, Agent, or Firm* — Patterson & Sheridan, LLP

(57) ABSTRACT

Techniques are provided for packet routing in a distributed network switch. The distributed network switch includes multiple switch modules operatively connected to one another, and each switch module includes multiple bridge elements and a management controller. In one embodiment, a shared interface routing (SIR) framework is provided that includes an analysis and bifurcation layer and at least one packet interface. A packet is received over a first logical network and via a physical port, the packet being destined for at least a first application executing on the management controller. The analysis and bifurcation layer analyzes the packet and sends the packet to the packet interface, which then routes the packet to the first application.

20 Claims, 10 Drawing Sheets

(56) References Cited

U.S. PATENT DOCUMENTS

| | | |
|---|---|---|
| 2007/0280105 A1* | 12/2007 | Barkay et al. .................. 370/229 |
| 2007/0280243 A1 | 12/2007 | Wray et al. |
| 2007/0286195 A1 | 12/2007 | Ilnickl et al. |
| 2008/0201772 A1 | 8/2008 | Mondaeev et al. |
| 2010/0061379 A1 | 3/2010 | Parandekar et al. |
| 2010/0103837 A1 | 4/2010 | Jungck et al. |
| 2010/0232435 A1 | 9/2010 | Jabr et al. |
| 2010/0329262 A1 | 12/2010 | Wing et al. |
| 2013/0208721 A1 | 8/2013 | Armstrong et al. |
| 2013/0208722 A1 | 8/2013 | Armstrong et al. |
| 2013/0208726 A1 | 8/2013 | Armstrong et al. |

OTHER PUBLICATIONS

Pan et al., "PF_IPOPTION: A Kernal Extension for IP Option Packet Processing", Jun. 15, 2000, pp. 1-12, Columbia University, New York, USA.

* cited by examiner

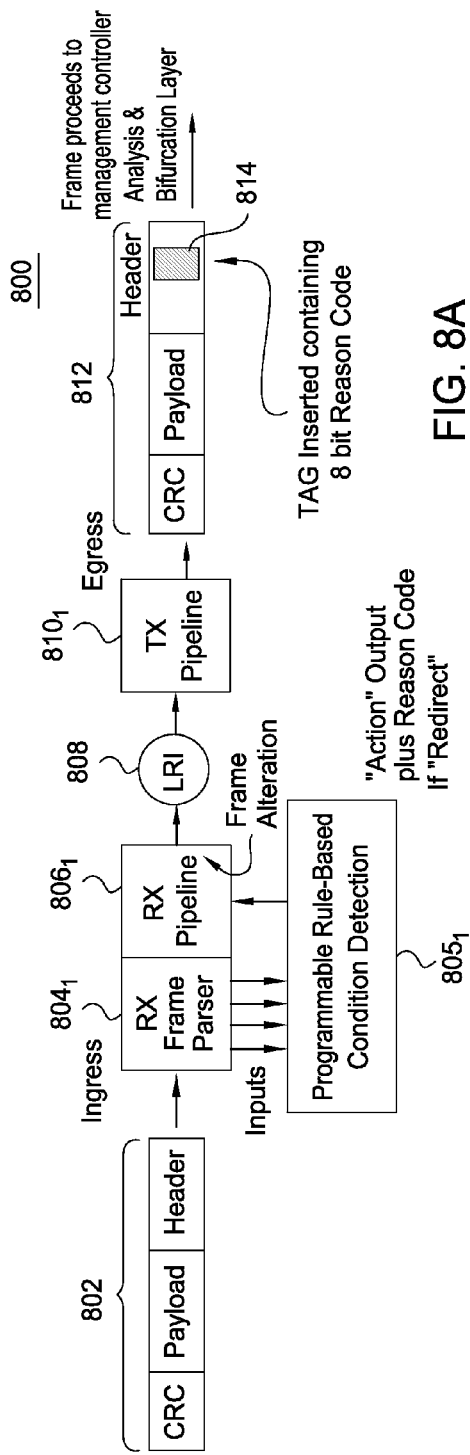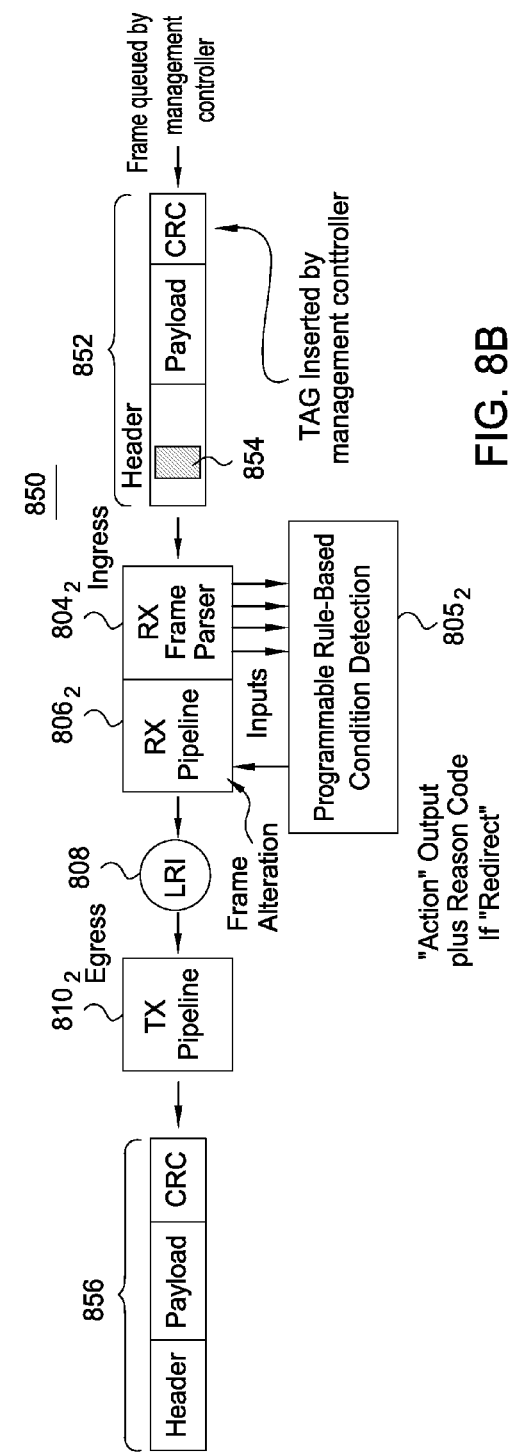
FIG. 8A
FIG. 8B

PACKET ROUTING FOR EMBEDDED APPLICATIONS SHARING A SINGLE NETWORK INTERFACE OVER MULTIPLE VIRTUAL NETWORKS

CROSS-REFERENCE TO RELATED APPLICATIONS

This application is a continuation of co-pending U.S. patent application Ser. No. 13/396,090, filed Feb. 14, 2012. The aforementioned related patent application is herein incorporated by reference in its entirety.

BACKGROUND

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or PCIe slots as well as permit communication between servers in the same or different chassis.

Further, multiple switches may be combined to create a distributed network switch. However, the communication interface between the distributed network switch and the servers may become so busy that packets are dropped (or lost). That is, a server may transmit packets to a switch faster than the switch can process the received packets. If the buffer associated with the switch fills up, subsequent packets may be dropped. To avoid packet loss, a switch may instruct the server to temporarily stop sending packets to the switch. The switch may use this period of time to relieve network congestion.

SUMMARY

Embodiments of the invention provide a method, product and system for performing an operation for packet routing in a distributed network switch, the distributed network switch comprising multiple switch modules operatively connected to one another, each switch module including a plurality of bridge elements and a management controller. The operation includes providing, by the distributed network switch, a shared interface routing (SIR) framework that includes an analysis and bifurcation layer and at least one packet interface. The operation also includes receiving, by the management controller, a packet from a first logical network via a physical port destined for at least a first application executing on the management controller. The physical port is shared between multiple applications executing on the management controller to send and receive traffic over multiple logical networks, where the multiple logical networks includes the first logical network. The operation also includes analyzing the packet by the analysis and bifurcation layer of the SIR framework. The operation also includes sending the packet to the at least one packet interface, based on the analysis. The operation also includes routing, by the first packet interface, the packet to the first application executing on the management controller.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 8A-8B are data flow diagrams depicting components of a system for packet routing in a distributed network switch, according to one embodiment of the invention.

DETAILED DESCRIPTION

Figure 1:
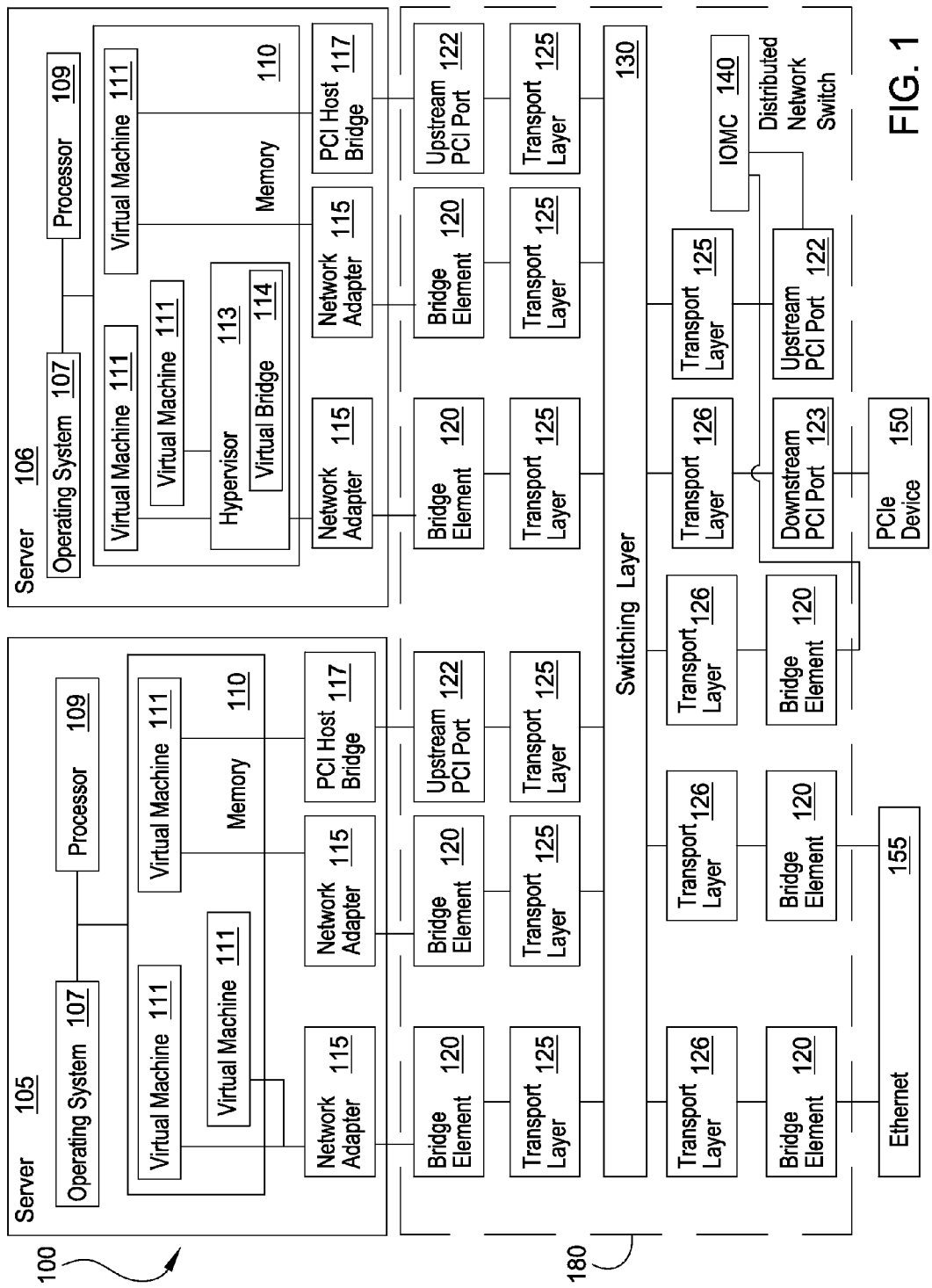
FIG. 1 illustrates a system architecture that includes a distributed network switch, according to one embodiment of the invention.

Embodiments of the invention provide techniques for packet routing for a distributed network switch. The distributed network switch includes multiple switch modules operatively connected to one another, and each switch module includes multiple bridge elements and a management controller. One embodiment provides a shared interface routing (SIR) framework that includes an analysis and bifurcation layer and at least one packet interface. The management controller receives a packet from a first logical network and via a physical port, where the packet is destined for at least a first application executing on the management controller. The physical port is configured to be shared between a plurality of applications executing on the management controller to send or receive traffic over a plurality of logical networks. The analysis and bifurcation layer analyzes the packet and sends the packet to the packet interface. The packet interface then routes the packet to the first application. Accordingly, the distributed network switch may support packet routing for multiple embedded applications sharing a single physical port over multiple logical networks.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a system architecture that includes a distributed network switch, according to one embodiment of the invention. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105.

The server 105 may operate under the control of an operating system 107 and execute various computer software applications, components, programs, objects, modules, and data structures, such as virtual machines 111.

The server 105 may include network adapters 115 (e.g., converged network adapters, or CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the switch fabric, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that couple to one of the bridge elements 120. Additionally, to facilitate PCIe communication, the server may have a PCI Host Bridge 117. The PCI Host Bridge would then connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed network switch 180. For example, a network adapter 115 and bridge element 120 may be connected using two 40 Gbit Ethernet connections or one 100 Gbit Ethernet connection. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180.

The distributed network switch 180, in general, includes a plurality of bridge elements 120 that may be located on a plurality of a separate, though interconnected, hardware components. To the perspective of the network adapters 115, the distributed network switch 180 acts like one single switch even though the distributed network switch 180 may be composed of multiple switches that are physically located on different components. Distributing the network switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

Although not shown in FIG. 1, in one embodiment, the switching layer 130 may comprise a local rack interconnect (LRI) which connects bridge elements 120 located within the same chassis and rack, as well as links that connect to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 150. The PCIe device 150 may be a passive backplane interconnect, as an expansion card interface for add-in boards, or common storage that can be accessed by any of the servers connected to the distributed network switch 180.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130.

Although one IOMC 140 is shown, the system 100 may include a plurality of IOMCs 140. In one embodiment, these IOMCs 140 may be arranged in a hierarchy such that one IOMC 140 is chosen as a master while the others are delegated as members.

Figure 2:
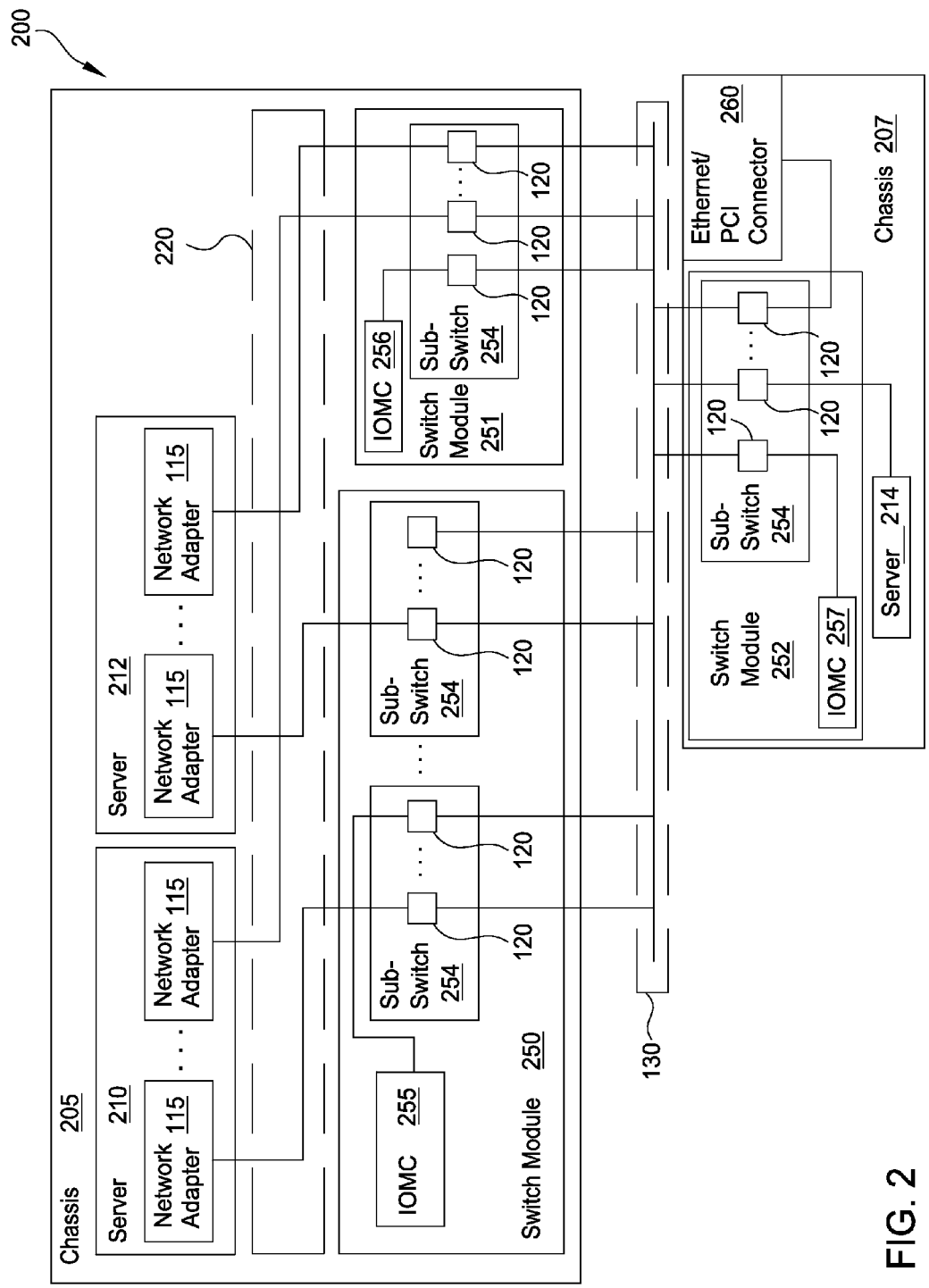
FIG. 2 illustrates the hardware representation of a system that implements a distributed network switch, according to one embodiment of the invention.

FIG. 2 illustrates a hardware level diagram of the system 100, according to one embodiment. Server 210 and 212 may be physically located in the same chassis 205; however, the chassis 205 may include any number of servers. The chassis 205 also includes a plurality of switch modules 250, 251 that include one or more sub-switches 254. In one embodiment, the switch modules 250, 251, 252 are hardware components (e.g., PCB boards, FPGA boards, system on a chip, etc.) that provide physical support and connectivity between the network adapters 115 and the bridge elements 120. In general, the switch modules 250, 251, 252 include hardware that connects different chassis 205, 207 and servers 210, 212, 214 in the system 200.

The switch modules 250, 251, 252 (i.e., a chassis interconnect element) include one or more sub-switches 254 and an IOMC 255, 256, 257. The sub-switches 254 may include a logical or physical grouping of bridge elements 120. Each bridge element 120 may be physically connected to the servers 210, 212. For example, a bridge element 120 may route data sent using either Ethernet or PCI communication protocols to other bridge elements 120 attached to the switching layer 130. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module.

The dotted line in chassis 205 defines the midplane 220 between the servers 210, 212 and the switch modules 250, 251. That is, the midplane 220 includes the data paths that transmit data between the network adapters 115 and the sub-switches 254.

Each bridge element 120 connects to the switching layer 130. In addition, a bridging element 120 may also connect to a network adapter 115 or an uplink. As used herein, an uplink port of a bridging element 120 provides a service that expands the connectivity or capabilities of the system 200. As shown in chassis 207, one bridging element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to a switching layer 130 that has network devices that are compatible with at least two different communication methods.

As shown, a server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridging elements 120 to update the routing tables and lookup tables to include the hardware elements on the new switching module.

Figure 3:
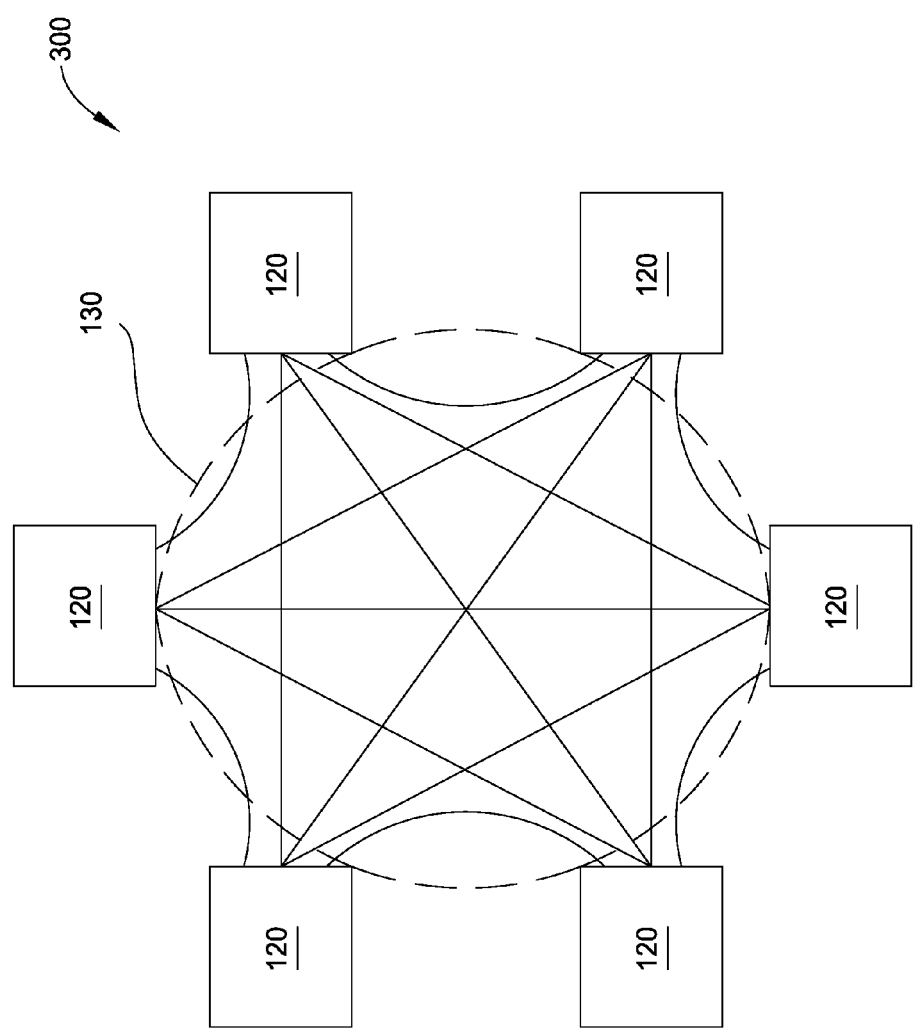
FIG. 3 illustrates a distributed network switch, according to one embodiment of the invention.

FIG. 3 illustrates a virtual switching layer, according to one embodiment of the invention. Each bridging element 120 in the systems 100 and 200 are connected to each other using the switching layer 130 via a mesh connection schema. That is, no matter the bridging element 120 used, a cell (i.e., data packet) can be routed to another other bridging element 120 located on any other switch module 250, 251, 252. This may be accomplished by directly connecting each bridging element 120—i.e., each bridging element 120 has a dedicated data path to every other bridging element 120. Alternatively, the switching layer 130 may use a spine-leaf architecture where each bridging element 120 (i.e., a leaf node) is attached to at least one spine node. The spine nodes route cells received from the bridging elements 120 to the correct spine node which then forwards the data to the correct bridging element 120. However, this invention is not limited to any particular technique for interconnecting the bridging elements 120.

Accordingly, the distributed network switch disclosed herein is configured to provide Layer 2 Ethernet switching via: multiple switch modules 250, 251, the LRI interconnecting the switch modules 250, 251, and management firmware executing on a management controller such as the IOMC 255, 256, 257. Doing so may eliminate the need for stand-alone Ethernet switches to interconnect processing elements in the servers 105, 106. At least in some embodiments, the networked system may also be augmented in a granular and/or scalable manner by adding individual components such as switch modules and/or processing elements.

In one embodiment, each switch module 250, 251 is operatively connected to multiple bridge elements. In a particular embodiment, each switch module is configured to use four bridge elements, where each bridge element is a distributed Virtual Ethernet Bridge (dVEB) that supports data transfer rates of one hundred gigabits per second (100 Gbps). The dVEBs are managed by firmware executing on the management controller.

Figure 4:
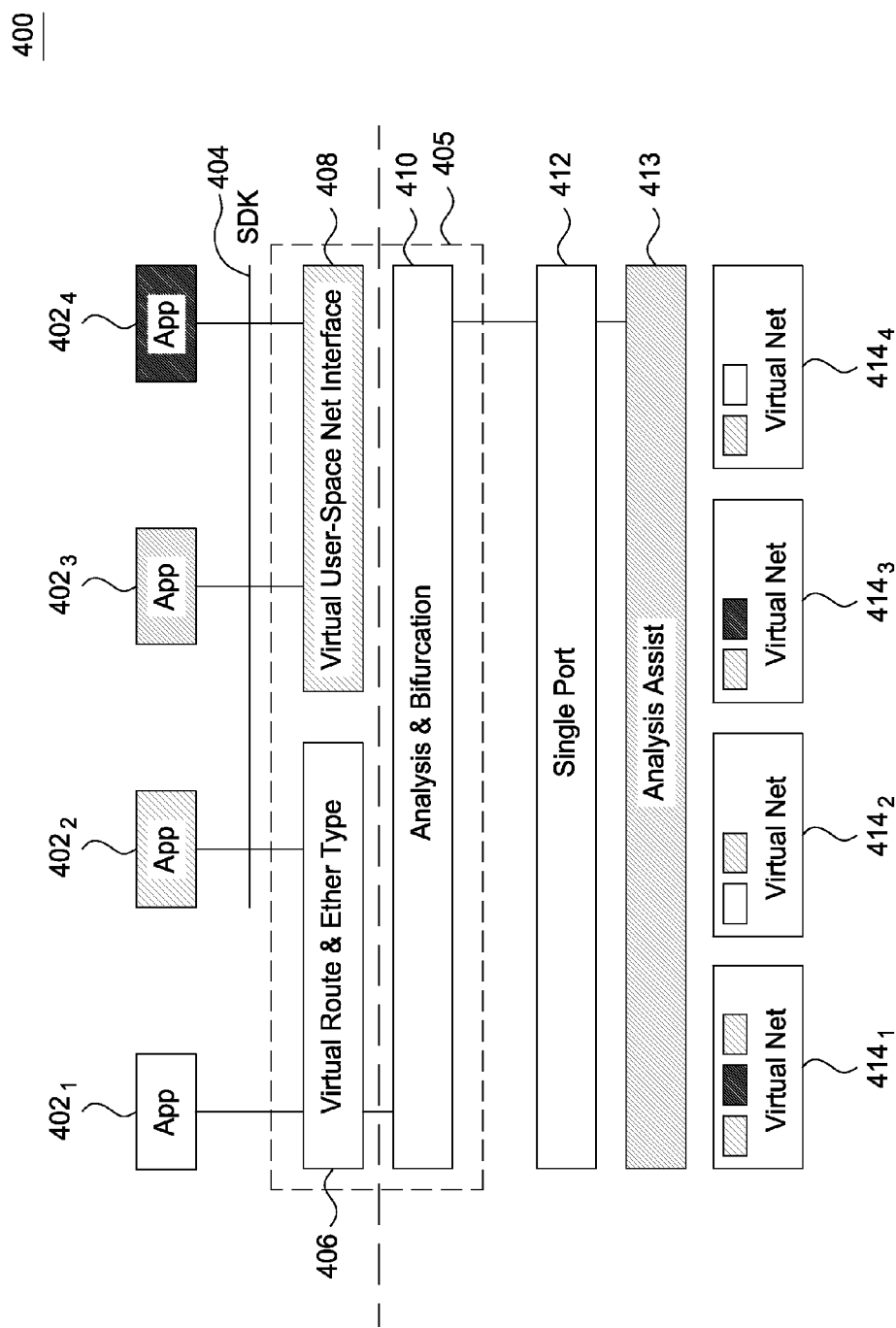
FIG. 4 is a block diagram depicting components of a system for packet routing in a distributed network switch, according to one embodiment of the invention.

FIG. 4 is a block diagram depicting components 400 of a system for packet routing in a distributed network switch, according to one embodiment of the invention. As shown, the components 400 include applications $402_{1-4}$ executing on the management controller such as the IOMC. More specifically, the applications $402_{1-4}$ may execute within an environment provided by an operating system (not shown) executing on the management controller, where the operating system divides memory associated with the management controller into user space and kernel space. The switch module may rely on firmware executing on the management controller to handle processing according to one or more predetermined control protocols for the switch module. The management controller may also execute services accessed by external applications via multiple logical ports. A variety of data flows may occur over the ports of the switch module, pertaining to different applications and different control protocols.

In one embodiment, the switch module is configured to support packet routing over multiple logical networks for multiple applications sharing a single physical port of the switch module. To this end, the components 400 also include a shared interface routing (SIR) framework 405 configured to route packets $416_{1-9}$ from different logical networks $414_{1-4}$ to the applications $402_{1-4}$ via a single port 412 of a bridging element of a switch module. The applications $402_{2-4}$ may be configured to access the SIR framework 405 via a predefined application programming interface (API) provided by a software development kit (SDK) 404.

In one embodiment, the SIR framework 405 includes an analysis and bifurcation layer 410, a virtual route and ether type (VRET) layer 406 and a virtual user-space net interface (VUSI) layer 408. In one embodiment, the analysis and bifurcation layer 410 is implemented in the kernel space of the management controller, while the VRET layer 406 and the VUSI layer 408 are implemented in the user space of the management controller. Implementing the analysis and bifurcation layer 410 in kernel space as opposed to user space may result in improved packet routing efficiency at least in some cases. The analysis and bifurcation layer 410 is configured to interpret hardware tags, read predefined packet fields, performs a first-level bifurcation into the user space of the management controller, and/or pass packets to a network stack of the operating system executing on the management controller. In some embodiments, the analysis and bifurcation layer 410 is configured to analyze packets in user- and/or kernel-space and route packets in user-space. Regardless of the manner in which the user space of the management controller receives a packet, the user space is defined within a separate operating system context from the kernel space. In some embodiments, the operating system defines a separate user space for each instantiated application, each user space having a respective operating system context.

In one embodiment, the VRET layer 406 includes at least two components including a packet pipe interface and a virtual network device interface. The packet pipe interface is a user-space interface configured to allow an application to define a pipe based on a predetermined field of an Ethernet frame, herein referred to as an ether type field. One example of the ether type field is "EtherType", which is a two-octet field indicating which protocol is encapsulated in the payload of an Ethernet Frame. In one embodiment, the packet pipe interface encapsulates Ethernet packets into netpipe packets that describe characteristics specific to the switch module and/or to the internal routing for a received frame (e.g., a receiving port).

In one embodiment, the virtual network device interface of the VRET layer 406 is configured to allow an application to use a network stack of the operating system to access packets. When the VRET layer 406 determines that a packet should be transmitted to the network stack, the virtual network device interface sends the packet to a virtual network device configured to send the packet to the rest of the network stack as though the virtual network device was a hardware device receiving the packet.

In one embodiment, the VUSI layer 408 defines an interface using hardware abstraction layer (HAL) techniques. The interface is configured such as to hide implementation and/or hardware-specific details from applications using the VUSI layer 408. In some embodiments, the VUSI layer 408 provides support for additional functionality in the SIR framework 405. Examples of additional functionality include quality-of-service (QoS) and hardware-assisted routing. The components 400 may also include an analysis assist layer 413 configured to parse and/or inspect incoming frames at the ingress ports of the switch module. The analysis assist layer 413 may be implemented in hardware and is further described below in conjunction with FIGS. 11-12.

By configuring the management controller of the switch module to include the SIR framework, embodiments of the invention provide a processing framework for parsing and analyzing incoming packets in kernel-space and transferring the packets to user-space, such as to designated queues and/or threads. Doing so allows specific Ethernet packets containing a variety of control protocols and/or application data flows in an embedded system to be routed, prioritized, and/or queued in a manner that may be more efficient to alternative approaches at least in some cases. An example of an alternative approach is providing a daemon running in user space, where the daemon is configured to copy every packet into user space and analyze the respective packet in user space. Embodiments of the invention may also prevent or at least reduce occurrences of traffic of lower-priority control protocols creating congestion for traffic of higher-priority control protocols over a single interface. Embodiments of the invention may also steer and/or categorize incoming control protocol traffic over different logical networks sharing a single interface.

Figure 5:
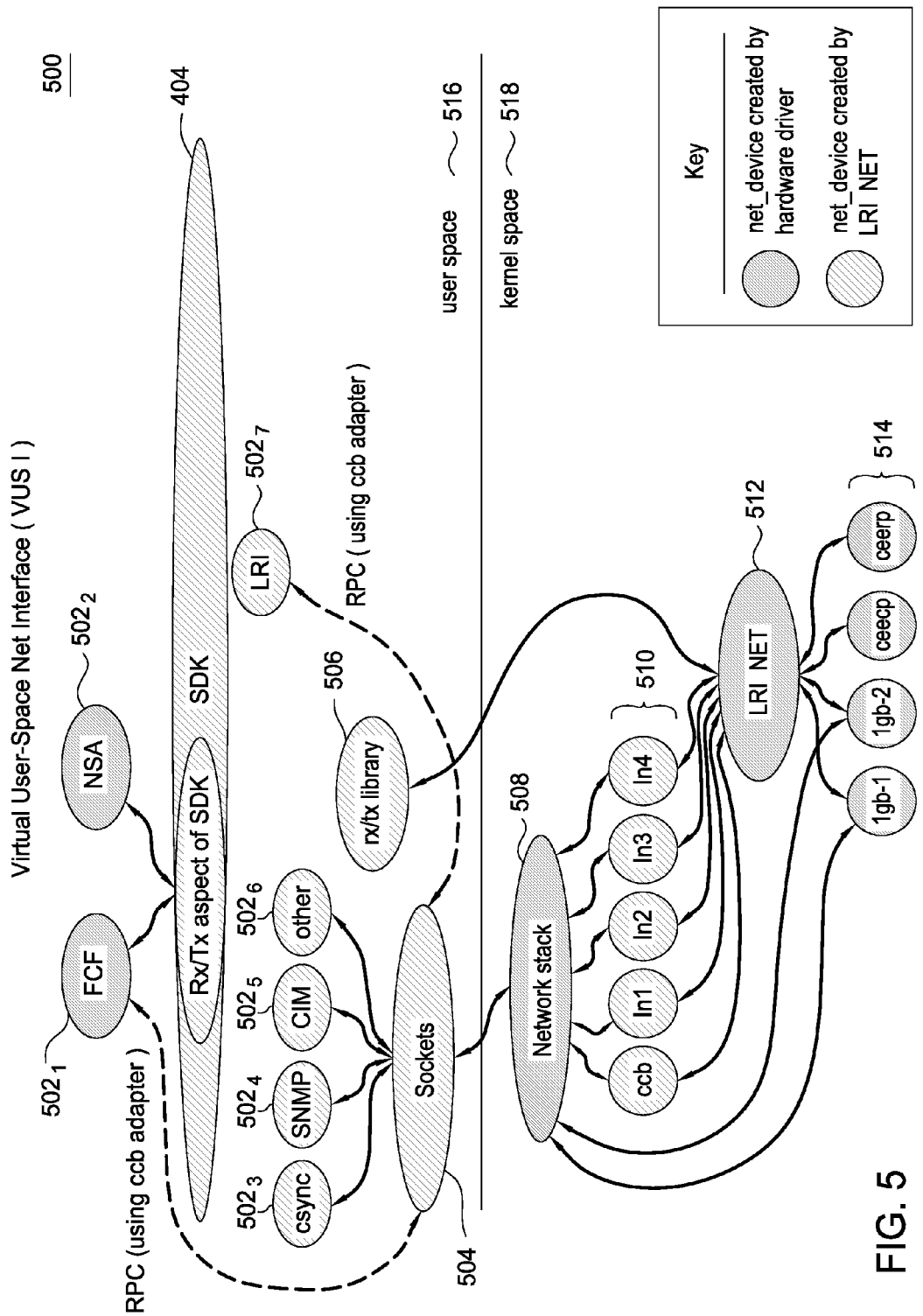
FIG. 5 is a data flow diagram depicting components of a system for packet routing using the virtual user-space net interface (VUSI) layer in a distributed network switch, according to one embodiment of the invention.

FIG. 5 is a data flow diagram depicting components 500 of a system for packet routing using the VUSI layer 408 in a distributed network switch, according to one embodiment of the invention. As shown, the components 500 in user space 516 include applications $502_{1-7}$, the SDK 404, sockets 504, and a sfit library 506. In one embodiment, the sfit library provides a user-space interface for sending and receiving packets, also referred to as an sfit RX/TX interface. The kernel-space components of the VUSI layer 408 may service multiple clients that implement the sfit RX/TX interface to communicate with the kernel-space components. Each application 502 uses a respective protocol such as Fibre Channel Fabric (FCF), Network Service Access (NSA), composite synchronization (csync), Simple Network Management Protocol (SNMP), Common Information Model (CIM), LRI, etc.

As shown, the components 500 in kernel space 518 include the network stack 508, virtual network devices 510, an LRI network (LRINET) component 512 and ports 514 of the CEE NIC. In one embodiment, the LRINET component 512 is a kernel driver configured to prioritize, route, and/or queue packets. In one embodiment, to use the virtual network devices 510, a VLAN configuration utility such as vconfig is first used to create VLAN devices on top of the virtual network devices. As shown, application traffic may be transmitted from the ports 514 to the applications 502 via the network stack 508 in kernel space 518 and via the sockets 504 in user space 516. Further, application traffic and/or control traffic may be transmitted from the ports 514 to the applications 502 via the LRINET component 512, the virtual network devices 510, the network stack 508, and the sockets 504. Alternatively, the application traffic and/or control traffic may be transmitted via the LRINET component 512, the sfit library 506. The applications 502 may optionally access the sfit library 506 via the SDK 404. Further, using a Central Controlling Bridge (CCB) interface, the applications 502 may alternatively access the sockets 804 using remote procedure calls (RPC).

In one embodiment, the virtual network devices 510 may be specific to a logical network only or specific to a logical network and VLAN. The virtual network devices may have MAC addresses corresponding to a general-purpose MAC of a CCB component of the switch module. At least in some embodiments, the CCB functions as a switch control point configured to receive packets for any additional processing required by the distributed network switch. The general-purpose MAC address refers to a switch functional MAC address configured to allow entities outside the switch to communicate with the switch as a network functional entity. Each received packet is inspected to identify associated logical networks, VLANs, network adapters, etc.

Figure 6:
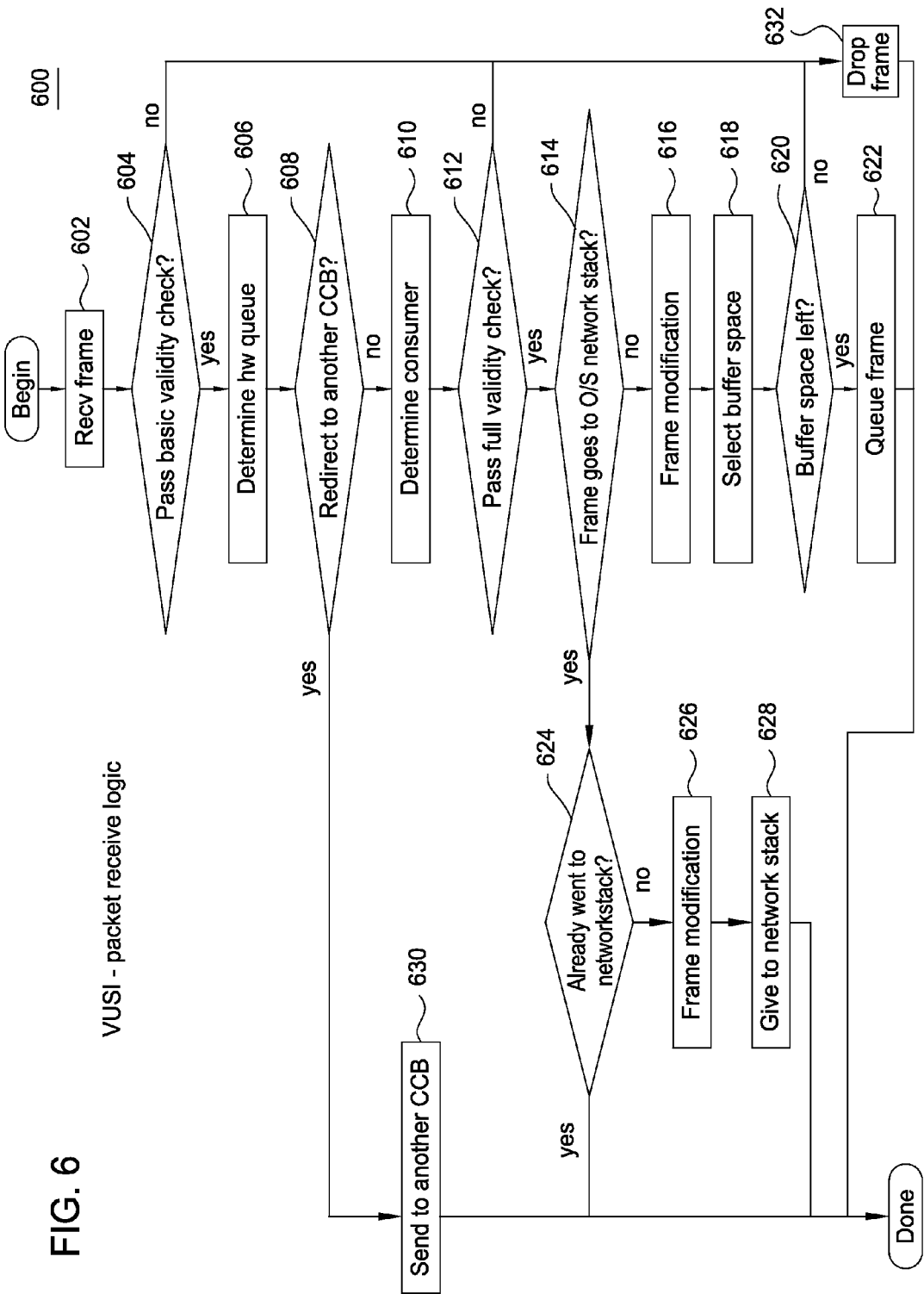
FIG. 6 is a flowchart depicting a method for receiving frames via the VUSI layer in a distributed network switch, according to one embodiment of the invention.

FIG. 6 is a flowchart depicting a method 600 for receiving frames via the VUSI layer 408 in a distributed network switch, according to one embodiment of the invention. The VUSI layer 408 first receives a frame (step 602) and determines if the frame passes a first validity check (step 604). If the frame does not pass the first validity check, the VUSI layer 408 drops the frame (step 632). Otherwise, the VUSI layer 408 then determines a queue associated with the frame (step 606) and determines whether to redirect the frame to a different CCB (step 608). If so, the VUSI layer 408 determines the consuming application (step 610) and determines whether the frame passes a second validity check (step 612). At least in some embodiments, each validity check verifies that a specified number of fields in the frame satisfy predetermined criteria, and the second validity check may involve a number of fields greater than that of the first validity check.

At step 614, the VUSI layer 408 determines whether the frame should be sent to the network stack. If so, the VUSI layer 408 verifies that the frame has not already been sent to the network stack (624), modifies the frame according to techniques described above (step 626), and sends the modified frame to the network stack (628). Otherwise, the VUSI layer 408 modifies the frame according to techniques described above (step 616) and selects a buffer space 618 for queuing the frame. If there is no buffer space left in the selected buffer (step 620), then the VUSI layer drops the frame (step 632). Otherwise, the VUSI layer queues the frame in the selected buffer (622). After the steps 622, 628, 630, or 632, the method 600 terminates.

Figure 7:
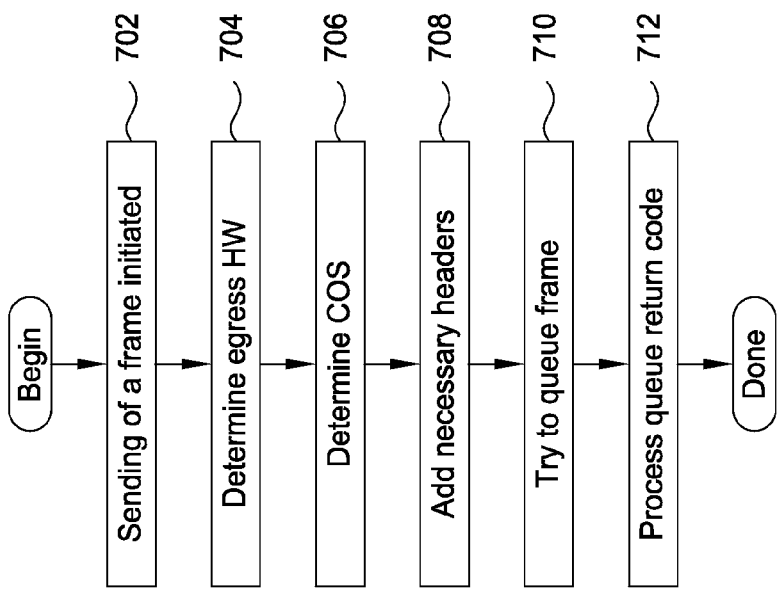
FIG. 7 is a flowchart depicting a method for sending frames via the VUSI layer 408 in a distributed network switch, according to one embodiment of the invention.

FIG. 7 is a flowchart depicting a method 700 for sending frames via the VUSI layer 408 in a distributed network switch, according to one embodiment of the invention. As shown, the method 700 begins at step 702, where the VUSI layer 408 receives a frame to be sent. The VUSI layer 408 identifies an appropriate egress interface (step 704) and class of service (step 706). The VUSI layer 408 then adds one or more predetermined headers (step 708) and attempts to queue the frame (step 710). The VUSI layer then processes a return code associated with the attempt to queue the frame (step 712). After the step 712, the method 700 terminates.

As described above, in one embodiment, the SIR framework may include an analysis assist layer configured to parse and/or inspect incoming frames at the ingress ports of the switch module. Accordingly, the analysis assist layer may to offload at least some of the processing performed by the analysis and bifurcation layer. At least in embodiments where the analysis assist layer is implemented in hardware and the analysis and bifurcation layer is implemented in firmware or software, processor load on the management controller may be reduced and reserved for performing other tasks such as executing embedded applications.

In one embodiment, the analysis assist layer may classify each frame, preserve state information associated with the frame, and store the state information in reserved areas for transport across the LRI. The frame may then be routed to the specified destination. When the destination is the port connecting the management controller, the analysis assist layer stores the state information in a predefined header (such as a Q-in-Q header), inserts the CCB tag into the frame, and sends the frame to the management controller. The state information includes a reason code to be used by the analysis and bifurcation layer, eliminating the need for the analysis and bifurcation layer to parse the frame. For traffic originating from the management controller, the analysis and bifurcation layer may include state information and directives in a CCB tag that is subsequently used by the analysis assist layer to route the frame toward the specified destination. The state information and/or directives are configured to facilitate correct routing of frames for the distributed network switch.

FIGS. 8A-8B are data flow diagrams depicting components 800, 850 of a system for packet routing in a distributed network switch, according to one embodiment of the invention. As shown in FIG. 8A, the components 800 for processing ingress frames to the management controller include a receiving frame parser 804₁, a receiving pipeline 806₁, the LRI 808, and a transmitting pipeline 810₁. Ingress frames to the management controller include both frames directly routed to the management controller and frames to be redirected to the management controller. In one embodiment, an ingress frame 802 is received by the switch module on an ingress port. The receiving frame parser 804₁ provides inputs from the frame header to a programmable rule-based logic configured to detect one or more predetermined conditions. When the predetermined conditions are satisfied, the receiving frame parser 804₁ specifies to perform a given action and further specifies an accompanying reason code. Examples of the given action include redirecting the frame to the switch module or routing the frame normally.

In one embodiment, the receiving frame parser 804₁ then captures predetermined frame state information and stores the state information in an internal header used to route the frame across the LRI. The frame is then transmitted via the receiving pipeline 806₁, routed across the LRI, and presented to the transmitting pipeline 810₁. The transmitting pipeline 810₁ is configured to access the stored state information and insert an additional predefined tag 814 (such as a Q-in-Q tag) in the frame header. The predefined tag 814 includes a format type classifying the frame as: (i) a normal frame (also referred to as a functional frame), (ii) a redirected frame with a reason code identifying the reason for redirection, or (iii) a control frame. The frame is then sent out the egress port to the management controller. Subsequently, the analysis and bifurcation layer uses the format type and reason code to determine how to process the frame. In other words, the analysis and bifurcation layer no longer needs to perform frame parsing, saving some processor cycles on the management controller. If the frame is transmitted through the VUSI layer, the reason code may be propagated for use by one or more applications executing on the management controller.

As shown in FIG. 8B, the components 850 for processing frames from the management controller to an egress port also include a frame parser 804₂, a receiving pipeline 806₂, the LRI 808, and a transmitting pipeline 810₂. The egress frames include routed frames from the management controller to one or more end nodes, frames injected by the management controller, and frames targeted to specific end nodes after redirection to the management controller. In one embodiment, the management controller builds a frame and includes a predefined tag 854 (such as a CCB tag). The frame is then sent to an ingress port of the switch module. The receiving frame parser 804₂ then parses the frame, extracts predetermined information from the CCB tag and stores the extracted information for transport across the LRI 808. Information in the CCB tag may include directives to the analysis assist layer, such as "force tag", "VLAN present", or "skip source". The frame is then sent across the LRI 808 and arrives at the transmitting pipeline 810₂ of the egress port. The transmitting pipeline 810₂ then processes the frame accordingly (altering the frame as needed) and sends the frame out the egress port to the destination specified in the frame.

Figure 9:
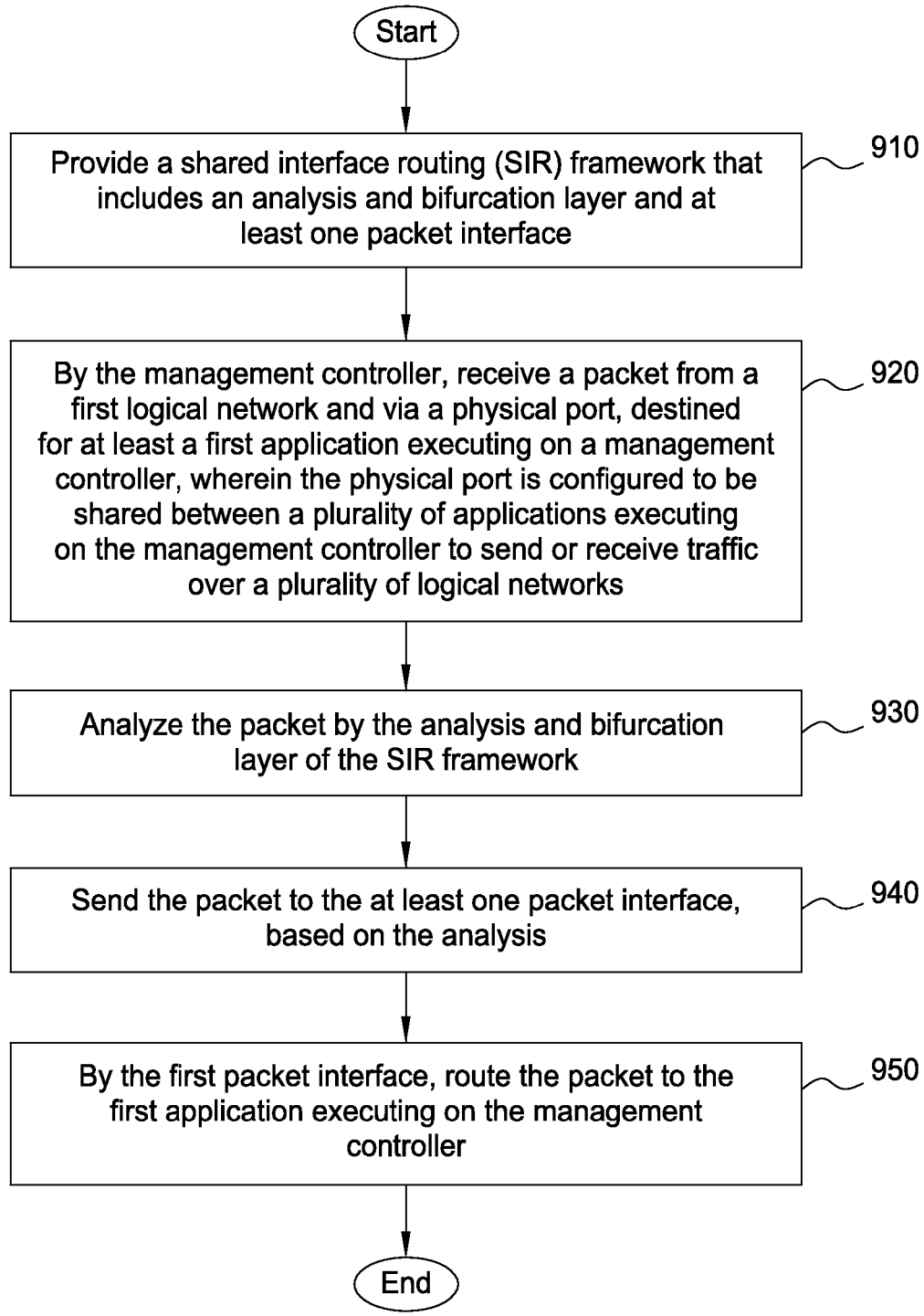
FIG. 9 is a flowchart depicting a method for packet routing in a distributed network switch, according to one embodiment of the invention.

FIG. 9 is a flowchart depicting a method 900 for packet routing in a distributed network switch, according to one embodiment of the invention. As shown, the method 900 begins at step 910, where the distributed network switch provides an SIR framework that includes an analysis and bifurcation layer and at least one packet interface. At step 920, the management controller receives a packet from a first logical network and via a physical port, where the packet is destined for a first application executing on the management controller. Further, the physical port is shared between multiple applications executing on the management controller to send or receive traffic over multiple logical networks including the first logical network. At step 930, the analysis and bifurcation layer of the SIR framework analyzes the packet. At step 940, the packet is sent to the at least one packet interface, based on the analysis. At step 950, the first packet interface routes the packet to the first application executing on the management controller. After the step 950, the method 900 terminates.

Figure 10:
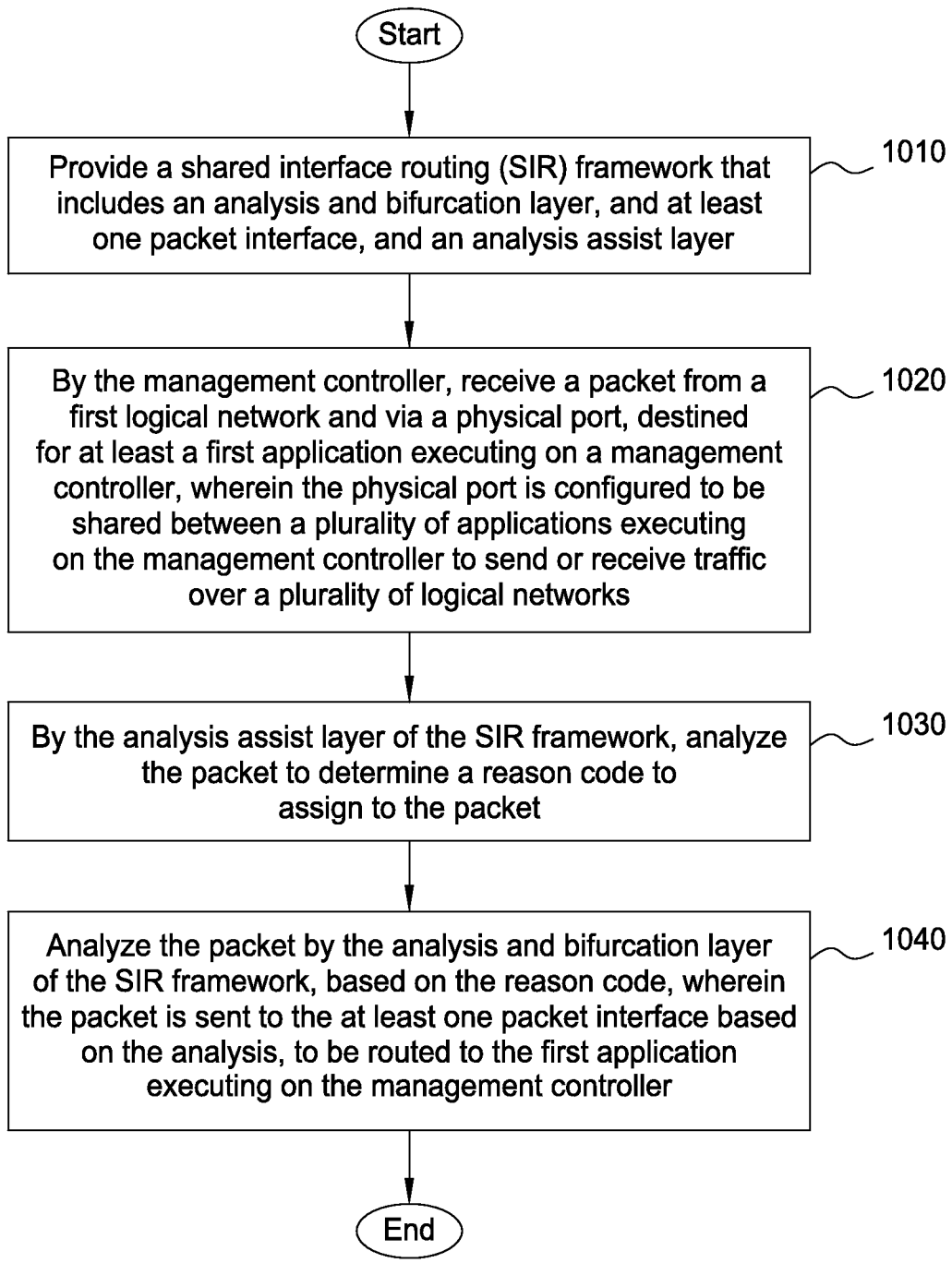
FIG. 10 is a flowchart depicting a method for packet routing in a distributed network switch with analysis assist, according to one embodiment of the invention.

FIG. 10 is a flowchart depicting a method 1000 for packet routing in a distributed network switch with analysis assist, according to one embodiment of the invention. As shown, the method 1000 begins at step 1010, where the distributed network switch provides an SIR framework that includes an analysis and bifurcation layer, at least one packet interface, and an analysis assist layer. At step 1020, the management controller receives a packet from a first logical network and via a physical port, where the packet is destined for a first application executing on the management controller. Further, the physical port is shared between multiple applications executing on the management controller to send or receive traffic over multiple logical networks including the first logical network. At step 1030, the analysis assist layer of the SIR framework analyzes the packet to determine a reason code to assign to the packet. At step 1040, the analysis and bifurcation layer of the SIR framework analyzes the packet based on the reason code, where the packet is sent to the at least one packet interface based on the analysis by the analysis and bifurcation layer, to be routed to the first application executing on the management controller. After the step 1040, the method 1000 terminates.

Embodiments of the invention provide techniques for packet routing for a distributed network switch. The distributed network switch includes multiple switch modules operatively connected to one another, each switch module including multiple bridge elements and a management controller. One embodiment provides a shared interface routing (SIR) framework that includes an analysis and bifurcation layer and at least one packet interface. The management controller receives a packet from a first logical network and via a physical port, the packet being destined for at least a first application executing on the management controller. The physical port is configured to be shared between a plurality of applications executing on the management controller to send or receive traffic over a plurality of logical networks. The analysis and bifurcation layer analyzes the packet and sends the packet to the packet interface, to be routed to the first application. Accordingly, the distributed network switch may support packet routing for multiple embedded applications sharing a single physical port over multiple logical networks.

While the foregoing is directed to embodiments of the present invention, other and further embodiments of the invention may be devised without departing from the basic scope thereof, and the scope thereof is determined by the claims that follow.

What is claimed is:

1. A computer-implemented method for packet routing in a distributed network switch, the distributed network switch comprising a plurality of switch modules operatively connected to one another, each switch module including a plurality of bridge elements and a management controller, wherein the method comprises:
providing, by the distributed network switch, a shared interface routing (SIR) framework that includes an analysis and bifurcation layer in kernel space and at least one packet interface in user space;
receiving, by the management controller, a packet from a first logical network via a physical port destined for at least a first application executing on the management controller, wherein the physical port is shared between a plurality of applications executing on the management controller to send and receive traffic over a plurality of logical networks, wherein the plurality of logical networks includes the first logical network;
analyzing the packet by the analysis and bifurcation layer of the SIR framework;
sending the packet to the at least one packet interface, based on the analysis; and
routing, by the at least one packet interface, the packet to the first application executing on the management controller.

2. The computer-implemented method of claim 1, wherein the SIR framework further includes a virtual route and ether type (VRET) layer and a virtual user-space net interface (VUSI) layer.

3. The computer-implemented method of claim 2, wherein the analysis and bifurcation layer is configured to execute in kernel space of the management controller, wherein the VRET and VUSI layers are configured to execute in user space of the management controller.

4. The computer-implemented method of claim 2, wherein the SIR framework defines a plurality of packet interfaces including at least a packet pipe interface, a virtual network device interface, and a hardware abstraction layer interface, at least one of which is the at least one packet interface.

5. The computer-implemented method of claim 4, wherein the packet pipe interface and the virtual network device interface are provided within the VRET layer, wherein the hardware abstraction layer interface is provided within the VUSI layer.

6. The computer-implemented method of claim 5, wherein the packet pipe interface is configured to define a pipe based on ether type, responsive to a call from the first application.

7. The computer-implemented method of claim 5, wherein the virtual network device interface is configured to provide, to the first application, access to the packet via a network stack associated with an operating system executing on the management controller.

8. The computer-implemented method of claim 5, wherein the packet pipe interface is configured to define a pipe based on ether type, responsive to a call from the first application, wherein the virtual network device interface is configured to provide, to the first application, access to the packet via a network stack associated with an operating system executing on the management controller.

9. The computer-implemented method of claim 8, wherein the SIR framework further includes an analysis assist layer configured to parse and inspect incoming frames at ingress ports of the plurality of switch modules in order to offload processing performed by the analysis and bifurcation layer;
wherein the analysis assist layer being configured to parse and inspect incoming frames includes the analysis assist layer being configured to determine and store state information including a reason code used by the analysis and bifurcation layer, thereby eliminating the need for the analysis and bifurcation layer to parse the incoming frames.

10. The computer-implemented method of claim 9, wherein the analysis and bifurcation layer is configured to execute in kernel space of the management controller, wherein the VRET and VUSI layers are configured to execute in user space of the management controller, wherein the VUSI layer provides support for additional functionality including at least quality of service (QoS) and hardware-assisted routing.

11. The computer-implemented method of claim 1, wherein the SIR framework includes a first layer comprising the analysis and bifurcation layer and further includes a second layer and a third layer, wherein the second layer includes a virtual network device interface component, wherein the third layer includes a hardware abstraction layer interface component, wherein the at least one packet interface is provided by at least one of the second layer and the third layer.

12. The computer-implemented method of claim 11, wherein the second layer comprises a virtual route and ether type (VRET) layer, wherein the third layer comprises a virtual user-space net interface (VUSI) layer.

13. The computer-implemented method of claim 1, wherein the SIR framework defines a plurality of packet interfaces including at least a packet pipe interface, a virtual network device interface, and a hardware abstraction layer interface, at least one of which is the at least one packet interface.

14. The computer-implemented method of claim 13, wherein the SIR framework further includes a virtual route and ether type (VRET) layer and a virtual user-space net interface (VUSI) layer, wherein the packet pipe interface and the virtual network device interface are provided within the VRET layer, wherein the hardware abstraction layer interface is provided within the VUSI layer.

15. The computer-implemented method of claim 14, wherein the packet pipe interface is configured to define a pipe based on ether type, responsive to a call from the first application.

16. The computer-implemented method of claim 14, wherein the virtual network device interface is configured to provide, to the first application, access to the packet via a network stack associated with an operating system executing on the management controller.

17. The computer-implemented method of claim 1, wherein the SIR framework further includes an analysis assist layer.

18. The computer-implemented method of claim 17, wherein the analysis assist layer is configured to parse and inspect incoming frames at ingress ports of the plurality of switch modules in order to offload processing performed by the analysis and bifurcation layer.

19. The computer-implemented method of claim 1, wherein the SIR framework further includes a virtual user-space net interface (VUSI) layer.

20. The computer-implemented method of claim 19, wherein the VUSI layer provides support for at least one of quality of service (QoS) and hardware-assisted routing.

* * * * *